(12) United States Patent
Hajimiri et al.

(10) Patent No.: US 10,720,797 B2
(45) Date of Patent: Jul. 21, 2020

(54) METHOD AND APPARATUS FOR DYNAMIC RF LENS FOCUSING AND TRACKING OF WIRELESS POWER RECOVERY UNIT

(71) Applicant: California Institute of Technology, Pasadena, CA (US)

(72) Inventors: Seyed Ali Hajimiri, La Canada, CA (US); Florian Bohn, Pasadena, CA (US); Behrooz Abiri, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/992,089

(22) Filed: May 29, 2018

(65) Prior Publication Data
US 2019/0006888 A1 Jan. 3, 2019

Related U.S. Application Data

(60) Provisional application No. 62/511,527, filed on May 26, 2017.

(51) Int. Cl.
*H02J 50/40* (2016.01)
*H01Q 21/22* (2006.01)
(Continued)

(52) U.S. Cl.
CPC .......... *H02J 50/40* (2016.02); *H01Q 21/225* (2013.01); *H02J 50/23* (2016.02); *H02J 50/80* (2016.02);
(Continued)

(58) Field of Classification Search
CPC .. H02J 50/40; H02J 50/80; H02J 5/005; H02J 7/025
See application file for complete search history.

(56) References Cited

U.S. PATENT DOCUMENTS

| 1,119,732 A | 5/1907 | Tesla |
| 5,400,037 A | 3/1995 | East |

(Continued)

FOREIGN PATENT DOCUMENTS

| CN | 101162267 A | 4/2008 |
| CN | 101309639 A | 11/2008 |

(Continued)

OTHER PUBLICATIONS

U.S. Appl. No. 14/078,489, Final Office Action dated Jun. 1, 2018.
(Continued)

*Primary Examiner* — Alfonso Perez Borroto
(74) *Attorney, Agent, or Firm* — Alston & Bird LLP

(57) ABSTRACT

A method of determining the phases of a multitude of transmitting elements of an RF power generating unit, includes, in part, activating one of transmitting element during the first time period, turning off the remaining transmitting elements during the first time period, transmitting an RF signal from the activated transmitting element to a device to be charged during the first time period, detecting a first phase value associated with the RF signal at the device during the first time period, transmitting the detected first phase value from the device to the generating unit during the first time period, and adjusting the phase of the activated transmitting element in response to the detected first phase value.

25 Claims, 5 Drawing Sheets

(51) Int. Cl.
*H04B 5/00* (2006.01)
*H02J 50/80* (2016.01)
*H02J 50/23* (2016.01)
*H04B 7/06* (2006.01)

(52) U.S. Cl.
CPC ............ *H04B 5/00* (2013.01); *H04B 5/0037* (2013.01); *H04B 7/0617* (2013.01)

(56) References Cited

U.S. PATENT DOCUMENTS

| | | | |
|---|---|---|---|
| 6,127,799 A | 10/2000 | Krishnan | |
| 6,184,651 B1 | 2/2001 | Fernandez et al. | |
| 6,208,287 B1* | 3/2001 | Sikina | H01Q 3/267 |
| | | | 342/174 |
| 6,404,268 B1 | 6/2002 | Hung et al. | |
| 6,664,770 B1 | 12/2003 | Bartels | |
| 6,946,950 B1 | 9/2005 | Ueno et al. | |
| 6,967,462 B1 | 11/2005 | Landis | |
| 7,027,311 B2 | 4/2006 | Vanderelli et al. | |
| 7,212,414 B2* | 5/2007 | Baarman | H02J 7/025 |
| | | | 363/16 |
| 7,356,952 B2* | 4/2008 | Sweeney | H02J 50/05 |
| | | | 40/446 |
| 7,522,878 B2* | 4/2009 | Baarman | H02J 13/0062 |
| | | | 455/41.1 |
| 7,554,316 B2* | 6/2009 | Stevens | H02J 50/12 |
| | | | 323/355 |
| 7,868,482 B2 | 1/2011 | Greene et al. | |
| 8,004,235 B2* | 8/2011 | Baarman | H02J 7/025 |
| | | | 320/108 |
| 8,284,055 B2 | 10/2012 | Butler et al. | |
| 8,396,173 B2* | 3/2013 | Ling | H04L 27/0014 |
| | | | 375/343 |
| 9,030,161 B2 | 5/2015 | Lu et al. | |
| 9,124,125 B2 | 9/2015 | Leabman et al. | |
| 9,130,397 B2 | 9/2015 | Leabman et al. | |
| 9,130,602 B2 | 9/2015 | Cook et al. | |
| 9,154,002 B2* | 10/2015 | Norconk | H02J 5/005 |
| 9,173,178 B2 | 10/2015 | Chakraborty et al. | |
| 9,252,846 B2 | 2/2016 | Lee et al. | |
| 9,601,267 B2* | 3/2017 | Widmer | H04B 5/0037 |
| 10,003,278 B2 | 6/2018 | Hajimiri et al. | |
| 10,320,242 B2 | 6/2019 | Hajimiri et al. | |
| 2002/0030527 A1 | 3/2002 | Hung et al. | |
| 2002/0090966 A1 | 7/2002 | Hansen et al. | |
| 2004/0005863 A1 | 1/2004 | Carrender | |
| 2004/0266338 A1 | 12/2004 | Rowitch | |
| 2006/0121869 A1 | 6/2006 | Natarajan et al. | |
| 2006/0205381 A1 | 9/2006 | Beart et al. | |
| 2006/0287596 A1 | 12/2006 | Johnson et al. | |
| 2007/0178945 A1 | 8/2007 | Cook et al. | |
| 2007/0182367 A1 | 8/2007 | Partovi et al. | |
| 2008/0014897 A1 | 1/2008 | Cook et al. | |
| 2008/0309452 A1 | 12/2008 | Zeine | |
| 2009/0011734 A1 | 1/2009 | Mertens et al. | |
| 2009/0261779 A1 | 10/2009 | Zyren | |
| 2010/0033021 A1 | 2/2010 | Bennett | |
| 2010/0034238 A1 | 2/2010 | Bennett | |
| 2010/0048255 A1 | 2/2010 | Jojivet et al. | |
| 2010/0142509 A1 | 6/2010 | Zhu et al. | |
| 2010/0181961 A1 | 7/2010 | Novak et al. | |
| 2010/0208848 A1 | 8/2010 | Zhu et al. | |
| 2010/0214159 A1 | 8/2010 | Ookawa et al. | |
| 2010/0259447 A1 | 10/2010 | Crouch | |
| 2010/0277003 A1 | 11/2010 | Von Novak et al. | |
| 2010/0309078 A1 | 12/2010 | Rofougaran et al. | |
| 2010/0315045 A1 | 12/2010 | Zeine | |
| 2010/0323616 A1 | 12/2010 | Von Novak et al. | |
| 2011/0025133 A1 | 2/2011 | Sauerlaender et al. | |
| 2011/0050166 A1 | 3/2011 | Cook et al. | |
| 2011/0053500 A1 | 3/2011 | Menegoli et al. | |
| 2011/0124310 A1 | 5/2011 | Theilmann et al. | |
| 2011/0127848 A1 | 6/2011 | Ryu et al. | |
| 2011/0151789 A1 | 6/2011 | Viglione et al. | |
| 2011/0156640 A1 | 6/2011 | Moshfeghi | |
| 2011/0167291 A1 | 7/2011 | Liu et al. | |
| 2011/0181237 A1 | 7/2011 | Hamedi-Hagh et al. | |
| 2012/0091799 A1 | 4/2012 | Rofougaran et al. | |
| 2012/0126636 A1 | 5/2012 | Atsumi | |
| 2012/0217111 A1 | 8/2012 | Boys et al. | |
| 2012/0294054 A1 | 11/2012 | Kim et al. | |
| 2012/0306284 A1 | 12/2012 | Lee et al. | |
| 2012/0326660 A1 | 12/2012 | Lu et al. | |
| 2013/0082651 A1 | 4/2013 | Park et al. | |
| 2013/0099584 A1 | 4/2013 | Von Novak, III | |
| 2013/0137455 A1 | 5/2013 | Xia et al. | |
| 2013/0201003 A1 | 8/2013 | Sabesan et al. | |
| 2013/0210477 A1 | 8/2013 | Peter | |
| 2013/0343106 A1 | 12/2013 | Perreault et al. | |
| 2014/0008993 A1 | 1/2014 | Leabman | |
| 2014/0015344 A1 | 1/2014 | Farrrokh | |
| 2014/0175893 A1 | 6/2014 | Sengupta et al. | |
| 2014/0333256 A1 | 11/2014 | Widmer et al. | |
| 2015/0015194 A1 | 1/2015 | Leabman et al. | |
| 2015/0022147 A1 | 1/2015 | Jung | |
| 2015/0130293 A1 | 5/2015 | Hajimiri et al. | |
| 2015/0144701 A1 | 5/2015 | Xian et al. | |
| 2015/0155739 A1 | 6/2015 | Walley et al. | |
| 2015/0372541 A1 | 12/2015 | Guo et al. | |
| 2016/0094091 A1 | 3/2016 | Shin et al. | |
| 2016/0134150 A1 | 5/2016 | Chen et al. | |
| 2016/0181873 A1 | 6/2016 | Mitcheson et al. | |
| 2016/0190872 A1 | 6/2016 | Bohn et al. | |
| 2016/0285481 A1 | 9/2016 | Cohen | |
| 2017/0111073 A1 | 4/2017 | Hajimiri et al. | |
| 2017/0237469 A1 | 8/2017 | Taghivand | |
| 2018/0226841 A1 | 8/2018 | Sengupta et al. | |
| 2018/0233963 A1 | 8/2018 | Sengupta et al. | |
| 2018/0233964 A1 | 8/2018 | Sengupta et al. | |
| 2019/0044390 A1 | 2/2019 | Hajimiri et al. | |
| 2019/0260237 A1 | 8/2019 | Bohn et al. | |

FOREIGN PATENT DOCUMENTS

| | | |
|---|---|---|
| CN | 102089952 A | 6/2011 |
| CN | 103748764 A | 4/2014 |
| CN | 103782521 A | 5/2014 |
| CN | 104885333 A | 9/2015 |
| EP | 2858209 A1 | 4/2015 |
| JP | 2008-245404 A | 10/2008 |
| JP | 2013-005529 A | 1/2013 |
| KR | 10-2011-0133242 A | 12/2011 |
| KR | 10-2011-0135507 A | 12/2011 |
| KR | 10-2012-0069496 A | 6/2012 |
| WO | WO 2007/084716 A2 | 7/2007 |
| WO | WO 2013/151259 A1 | 10/2013 |
| WO | WO 2014/075103 A1 | 5/2014 |
| WO | WO 2015/077726 A1 | 5/2015 |
| WO | WO 2015/077730 A1 | 5/2015 |
| WO | WO 2016/028939 A1 | 2/2016 |
| WO | WO 2017/053631 A1 | 3/2017 |

OTHER PUBLICATIONS

U.S. Appl. No. 14/078,489, Response to Final Office Action filed Dec. 3, 2018.
U.S. Appl. No. 14/078,489, Non-Final Office Action dated Jan. 28, 2019.
U.S. Appl. No. 14/552,414, Notice of Allowance dated Feb. 12, 2019.
U.S. Appl. No. 15/273,633, Response to Non-Final Office Action filed Feb. 22, 2019.
Baarman, "Making Wireless Truly Wireless: The need for a universal Wireless Power Solution," Wireless Power Consortium, (Sep. 2009). [Retrieved from the Internet Jan. 9, 2017: <https://www.wirelesspowerconsortium.com/technology/making-wireless-truly-wireless.html>].
Dickinson, "Evaluation of a Microwave High Power Reception Conversion Array for Wireless Power Transmission," Tech. Memo. 33-41, Jet Propulsion Laboratory, California Institute of Technol-

(56) References Cited

OTHER PUBLICATIONS ogy, (Sep. 1, 1975). [Retrieved from the Internet Jan. 9, 2017: <https://ntrs.nasa.gov/archive/nasa/casi.ntrs.nasa.gov/19760004119.pdf>].
Dickinson, "Performance of a High-Power, 2.388-GHz Receiving Array in Wireless Power Transmission Over 1.54 km," Microwave Symposium, 1976, IEEE-MTT-S International, pp. 139-141, IEEE, (1976).
Hirai, et al., "Practical Study on Wireless Transmission of Power and Information for Autonomous Decentralized Manufacturing System," IEEE Transactions on Industrial Electronics, 46(2):349-359, (1999).
Karalis, et al., "Efficient wireless non-radiative mid-range energy transfer," Annals of Physics, 323(2008):34-38, (2008).
Kotani et al., "High-Efficiency Differential-Drive CMOS Rectifier for UHF RFIDs," IEEE Journal of Solid-State Circuits, 44(11):3011-3018, (2009).
Kurs, et al., "Wireless Power Transfer via Strongly Coupled Magnetic Resonances," Science, 371(83):83-86, (2007).
Moon et al., "A 3.0-W Wireless Power Receiver Circuit with 75-% Overall Efficiency," IEEE Asian Solid State Circuits Conference (A-SSCC), pp. 97-100, Nov. 12, 2012.
Whitesides, "Researchers Beam 'Space' Solar Power in Hawaii," Wired Magazine, (Sep. 12, 2008). [Retrieved from the Internet Jan. 10, 2017: <https://www.wired.com/2008/09/visionary-beams/>].
Zheng, "Introduction to Air-to-air missiles system," Weapon Industry Press, Beijing, pp. 94-95, Dec. 31, 1997.
EP Supplementary European Search Report for application 13854148 dated Jun. 20, 2016.
EPO Application No. 15833852.5, Supplementary European Search Report and European Search Opinion dated May 18, 2018.
EPO Application No. EP14863147, Supplementary European Search Report completed Jun. 30, 2017.
EPO Application No. EP14863210, Supplementary European Search Report dated May 16, 2017.
PCT International Preliminary Report on Patentability for application PCT/US2013/069757 dated May 12, 2015.
PCT International Preliminary Report on Patentability for application PCT/US2014/067175 dated May 24, 2016.
PCT International Preliminary Report on Patentability for application PCT/US2014/067187 dated May 24, 2016.
PCT International Preliminary Report on Patentability for application PCT/US2015/045969 dated Feb. 21, 2017.
PCT International Search Report and Written Opinion of the International Searching Authority for application PCT/US2013/069757 dated Feb. 25, 2014.
PCT International Search Report and Written Opinion of the International Searching Authority for application PCT/US2014/067175 dated Mar. 16, 2015.
PCT International Search Report and Written Opinion of the International Searching Authority for application PCT/US2014/067187 dated Mar. 16, 2015.
PCT International Search Report and Written Opinion of the International Searching Authority for application PCT/US2015/045969 dated Oct. 23, 2015.
PCT International Search Report and Written Opinion of the International Searching Authority for application PCT/US2016/053202 dated Dec. 9, 2016.
U.S. Appl. No. 14/078,489, Final Office Action dated Feb. 24, 2017.
U.S. Appl. No. 14/078,489, Non-Final Office Action dated May 12, 2016.
U.S. Appl. No. 14/078,489, Non-Final Office Action dated Jun. 1, 2018.
U.S. Appl. No. 14/078,489, Non-Final Office Action dated Sep. 22, 2017.
U.S. Appl. No. 14/078,489, Response to Non-Final Office Action filed Mar. 20, 2018.
U.S. Appl. No. 14/078,489, Response to Non-Final Office Action filed Nov. 8, 2016.
U.S. Appl. No. 14/078,489, Supplemental Amendment filed Mar. 27, 2018.
U.S. Appl. No. 14/552,249, Non-Final Office Action dated Aug. 2, 2017.
U.S. Appl. No. 14/552,249, Notice of Allowance dated Feb. 22, 2018.
U.S. Appl. No. 14/552,249, Response to Non-Final Office Action filed Jan. 19, 2018.
U.S. Appl. No. 14/552,414, Final Office Action dated Oct. 26, 2017.
U.S. Appl. No. 14/552,414, Non-Final Office Action dated Mar. 24, 2017.
U.S. Appl. No. 14/552,414, Non-Final Office Action dated Mar. 26, 2018.
U.S. Appl. No. 14/552,414, Response to Final Office Action filed Jan. 25, 2018.
U.S. Appl. No. 14/552,414, Response to Non-Final Office Action filed Sep. 25, 2017.
U.S. Appl. No. 14/830,692, Non-Final Office Action dated Oct. 16, 2017.
U.S. Appl. No. 14/830,692, Notice of Allowance dated May 18, 2018.
U.S. Appl. No. 14/830,692, Requirement for Restriction/Election dated Jul. 6, 2017.
U.S. Appl. No. 14/830,692, Response to Non-Final Office Action filed Apr. 16, 2018.
U.S. Appl. No. 14/830,692, Response to Requirement for Restriction/Election filed Aug. 15, 2017.
U.S. Appl. No. 15/273,633, Requirement for Restriction/Election dated Mar. 28, 2018.
WIPO Application No. PCT/US2016/053202, PCT International Preliminary Report on Patentability dated Mar. 27, 2018.
U.S. Appl. No. 14/552,414, Notice of Allowance dated Oct. 9, 2018.
U.S. Appl. No. 14/552,414, Response to Non-Final Office Action filed Sep. 26, 2018.
U.S. Appl. No. 14/830,692, Notice of Allowance dated Jun. 14, 2018.
U.S. Appl. No. 15/273,633, Non-Final Office Action dated Sep. 20, 2018.
WIPO Application No. PCT/US2018/034947, PCT International Search Report and Written Opinion of the International Searching Authority dated Aug. 3, 2018.
U.S. Appl. No. 16/143,332, Non-Final Office Action dated Jul. 26, 2019.
WIPO Application No. PCT/US2018/034947, PCT International Preliminary Report on Patentability dated Nov. 26, 2019.
EPO Application No. EP16849637.0, Supplementary European Search Report completed Apr. 9, 2019.
U.S. Appl. No. 14/078,489, Notice of Allowance dated Jun. 3, 2019.
U.S. Appl. No. 14/552,414, Notice of Allowance dated Apr. 30, 2019.
U.S. Appl. No. 15/273,633, Final Office Action dated Jun. 13, 2019.
U.S. Appl. No. 15/942,211, Non-Final Office Action dated Jul. 29, 2019.
U.S. Appl. No. 15/952,124, Non-Final Office Action dated Jul. 29, 2019.
U.S. Appl. No. 15/952,128, Non-Final Office Action dated Jul. 29, 2019.
U.S. Appl. No. 16/109,591, Requirement for Restriction/Election dated Jul. 17, 2019.

* cited by examiner

METHOD AND APPARATUS FOR DYNAMIC RF LENS FOCUSING AND TRACKING OF WIRELESS POWER RECOVERY UNIT

CROSS REFERENCE TO RELATED APPLICATIONS

The present application claims benefit under 35 USC 119(e) of Application Ser. No. 62/511,527 filed May 26, 2017, the content of which is incorporated herein by reference in its entirety.

The present application is related to application Ser. No. 14/552,414, filed Nov. 24, 2014 and application Ser. No. 14/552,249, filed Nov. 24, 2014, the contents of both which applications are incorporated herein by reference in their entirety.

FIELD OF THE INVENTION

The present invention relates to wireless power transfer.

BACKGROUND OF THE INVENTION

The proliferation of portable devices, remote sensing and Internet of Things (IoT) continues to increase. Portable devices, remote sensors, and many other devices rely on energy stored in batteries which need regular charging or replacement.

Electrical energy stored in the batteries come predominantly from wired sources. Conventional wireless power transfer relies on magnetic inductive effect between two coils placed in close proximity of one another. To increase its efficiency, the coil size is selected to be less than the wavelength of the radiated electromagnetic wave. The transferred power diminishes strongly as the distance between the source and the charging device is increased.

Another technique for wirelessly powering a device is to transmit RF signals from a multitude of RF sources to the device. To improve efficiency, the phases of the RF signals should add constructively at the device. To achieve this, in one conventional system the device to be charged transmits a pilot signal. Each transmitter records the phase of the received pilot signal and calculates a corresponding conjugated phase which it then uses to transmit an RF signal. The receiver must include circuitry to generate a pilot signal that is frequency matched to that of the transmitter. The transmitter also requires at least one receiver per transmit antenna thus further adding to the complexity of the system. Accordingly, such systems require relatively high complexity in both the transmitter as well as the receiver.

Another technique in setting the correct phase for each source in the transmitter is described in commonly assigned U.S. application Ser. No. 14/830,692. In accordance with this technique, the amount of the power received at the device is fed back to the transmitter array to adjust the phase of each RF source in the array so as to maximize the power received at the device.

BRIEF SUMMARY OF THE INVENTION

A method of determining phases of N transmitting elements of an RF power generating unit where N is an integer greater than one, includes, in part, turning on a first transmitting element during the first time period, turning off the remaining (N−1) transmitting elements during the first time period, transmitting an RF signal from the first transmitting element to a device to be charged during the first time period, detecting a first phase value associated with the RF signal at the device during the first time period, transmitting the detected first phase value from the device to the generating unit during the first time period, and adjusting the phase of the first transmitting element in response to the detected first phase value.

The method further includes, in part, turning off the first transmitting element, turning on a second transmitting element, different from the first transmitting element, during a second time period, maintaining the remaining transmitting elements off during the second time period, transmitting an RF signal from the second transmitting element to the device during the second time period, detecting at the device a second phase value associated with the RF signal transmitted by the second transmitting element during the second time period, transmitting the detected second phase value from the device to the generating unit during the second time period, and adjusting the phase of the second transmitting element in response to the detected second phase value.

In one embodiment, the first phase value is detected from the RF signal as received by at least one receiving element disposed in the device. In one embodiment, the first phase value is detected from the RF signal as received by a multitude of receiving elements disposed in the device. In one embodiment, the first phase value is detected relative to a phase of an oscillating signal disposed in the device. In one embodiment, the method further includes, in part, converting the RF signal transmitted by the first transmitting element to an in-phase baseband signal; and converting the RF signal transmitted by the first transmitting element to a quadrature baseband signal. In one embodiment, the method further includes, in part, converting the in-phase baseband signal to a first digital signal, and converting the quadrature baseband signal to a second digital signal.

In one embodiment, the method further includes, in part, detecting the first phase value from the first and second digital signals. In one embodiment, the first phase value is detected relative to a phase of a timing data received by the device from the generating unit. In one embodiment, the timing data is transmitted using a first frequency different from a second frequency used to transmit the first RF signal. In one embodiment, the method further includes, in part, switching between the transmission of the timing data from at least one of the remaining (N−1) transmitting elements and the transmission of the RF signal from the first transmitting element. In one embodiment, the timing data is transmitted from at least one of the transmitting elements. In one embodiment, the receiving element is positioned along a center of an array of receiving elements disposed in the device.

A system, in accordance with one embodiment of the present invention, includes, in part, an RF power generating unit and an RF power recovery unit being charged by the RF power generating unit. In one embodiment, the RF power generating unit includes, in part, N transmitting elements where N is an integer greater than one, and a controller configured to: turn on one of the N transmitting elements during a first time period, turn off the remaining (N−1) transmitting elements during the first time period and transmit a first RF signal from the first transmitting element during the first time period. In one embodiment, the recovery unit is configured to detect a first phase value associated with the first RF signal during the first time period, and transmit the detected first phase value to the generating unit during the first time period. The generating unit is further configured to adjust the phase of the first transmitting element in response to the detected first phase value.

In one embodiment, the controller is further configured to turn off the first transmitting element, turn on a second transmitting element, different from the first transmitting element, during a second time period, maintain the remaining (N−2) transmitting elements off during the second time period, and transmit a second RF signal from the second transmitting element to the recovery unit during the second time period. The recovery unit is further configured to detect a second phase value associated with the second RF signal during the second time period and transmit the detected second phase value to the generating unit during the second time period. The generating unit is further configured to adjust the phase of the second transmitting element in response to the detected second phase value.

In one embodiment, the first phase value is detected from the first RF signal as received by at least one receiving element disposed in the recovery unit. In one embodiment, the first phase value is detected from the first RF signal as received by a multitude of receiving elements disposed in the recovery unit.

In one embodiment, the first phase value is detected relative to a phase of an oscillating signal disposed in the recovery unit. In one embodiment, the recovery unit further includes, in part, a first mixer configured to convert the first RF signal to an in-phase baseband signal, and a second mixer configured to convert the first RF signal to a quadrature baseband signal. In one embodiment, the recovery unit further includes, in part, a first analog-to-digital converter configured to convert the in-phase baseband signal to a first digital signal, and a second analog-to-digital converter configured to convert the quadrature baseband signal to a second digital signal. In one embodiment, the recovery unit is further configured to detect the first phase value from the first and second digital signals.

In one embodiment, the first phase value is detected relative to timing data received by the recovery unit from the generating unit. In one embodiment, the first receiving element is positioned along a center of an array of receiving elements disposed in the recovery unit.

A method of determining phases of N transmitting elements of an RF power generating unit, where N is an integer greater than one, includes, in part, turning on a first subset of the N transmitting elements during a first time period, turning off the transmitting elements during the first time period, transmitting a first set of RF signals from the first subset to a device to be powered during the first time period, turning off the first subset, turning on a second subset of the N transmitting elements during a second time period wherein the second subset is different than the first subset, transmitting a second set of RF signals from the second subset to the device during the second time period, receiving a first signal value associated with the first set of RF signals at the device, receiving a second signal value associated with the second set of RF signals at the device, and determining a phase of at least one transmitting element common to both the first and second subsets from the first and second signal values.

A method of determining phases of N transmitting elements of an RF power generating unit, where N is an integer greater than one, includes, in part, turning on a first transmitting element during a first time period, turning off the remaining (N−1) transmitting elements during the first time period, transmitting an RF signal from the first transmitting element to a device to be powered during the first time period, turning on a second transmitting element during a second time period while maintaining the first transmitting elements on, transmitting an RF signal from each of the first and second transmitting elements, detecting a first signal value from the RF signal received during the first time period, detecting a second signal value from the RF signals received during the second time period, and determining a phase value associated with the second transmitting element from the first and second values.

DETAILED DESCRIPTION OF THE INVENTION

In accordance with embodiments of the present invention, an array of transmitting elements transmits a multitude of RF signals to a device to be charged. To improve power transfer efficiency, the RF signals arriving at each receive antenna of the device are substantially in phase. In other words, the phases of the transmitting elements, collectively forming a generating unit, are selected so that they add constructively at the antenna(s) of the device being charged (referred to herein alternatively as recovery unit) while they cancel out due to destructive interference at other locations. Such phase selection results in maximum efficiency of power delivery to the recovery unit since the RF power will be concentrated on the antenna(s) of the recovery unit. In addition, the amplitudes of the transmitting elements can be adjusted to further maximize power delivery or to achieve a particular beam shape such as a minimum width beam, a Guassian beam, a Bessel beam, a Tophat beam or other desirable beam shapes.

Figure 1:
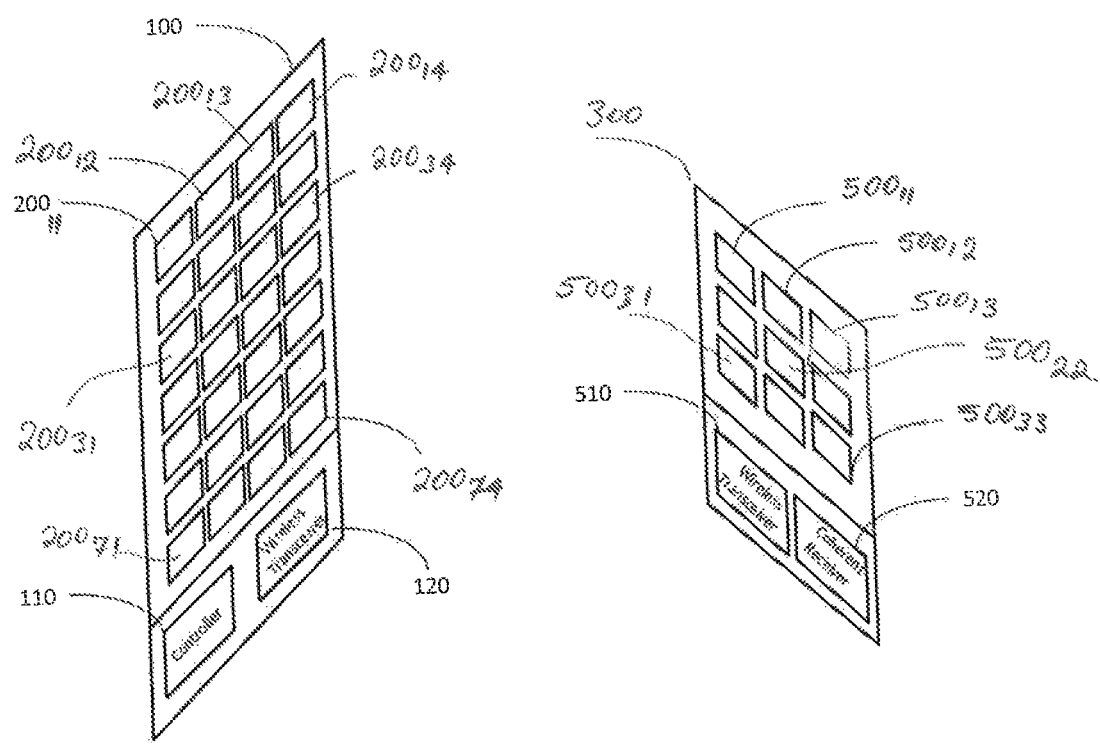
FIG. 1 is a simplified high-level schematic block diagram of a generating unit adapted to wirelessly power a recovery unit using RF signals, in accordance with one embodiment of the present invention

FIG. 1 is a simplified high-level schematic block diagram of a generating unit 100 adapted to wirelessly power recovery unit 500 using RF signals, in accordance with one embodiment of the present invention. Exemplary embodiment 100 of generating unit 100 is shown as including 28 transmitting elements $200_{ij}$ forming an array arranged along 7 rows and 4 columns, where i and j are integers. For example, the first row of the array is shown as including RF transmitting elements $200_{11}$, $200_{12}$, $200_{13}$ and $200_{14}$. Likewise, the seventh row of the array is shown as including RF transmitting elements $200_{71}$, $200_{72}$, $200_{73}$ and $200_{74}$. Although generating unit 100 is shown as including 28 transmitting elements disposed along 7 rows and 4 columns, it is understood that a generating unit, in accordance with embodiments of the present invention, many have any number N of transmitting elements arranged along one dimension (not shown), two dimensions (as shown in FIG. 1) or three dimensions (not shown) in any arrangement, such as rectangular, cubic, circular, elliptical, spherical, oblong or otherwise. Generating unit 100 is also shown as including a controller 110 and transceiver 120, as described further below.

Exemplary embodiment 300 of the device being charged (recovery unit) is shown as including 9 receiving elements $300_{kl}$ forming an array arranged along 3 rows and 3 columns. For example, the first row of the array is shown as including RF receiving elements $500_{11}$, $500_{12}$, and $500_{13}$. Likewise, the third row of the array is shown as including RF receiving elements $500_{31}$, $500_{32}$, and $500_{33}$. Although recover unit 300 is shown as including 9 receiving elements disposed along 3 rows and 3 columns, it is understood that a recovery unit, in accordance with embodiments of the present invention, many have any number M of receiving elements disposed along one dimension (not shown), two dimensions (as shown in FIG. 1) or three dimensions (not shown). Recovery unit 300 is also shown as including a wireless transceiver 510 and a coherent receiver 520, as described further below. It is understood that M and N may or may not be equal or may or not may not be arranged in a rectangular fashion.

In order to set the phase of each transmitting element $200_{ij}$, in accordance with one embodiment of the present invention, generating unit 100 turns off all but of one the transmitting elements at any given time and determines the phase of the signal transmitted by that transmitting element at the recovery unit. For example, assume during the first time period $T_1$ only transmitting element $200_{11}$ is turned on. The RF signal transmitted by transmitting element $200_{11}$ during $T_1$ is received by one or more of the receiving elements $500_{kl}$ and delivered to coherent receiver 520, where k and l are integers. In response, coherent receiver 520 detects the phase of the signal it receives relative to, for example, the phase of the oscillator disposed therein. For example, assume that the RF signal transmitted by transmitting element $200_{11}$ during $T_1$ is received by receiving elements $500_{22}$—positioned near the center of the array of the recovery unit—and delivered to coherent receiver 520. Coherent receiver 520 detects the phase of the signal received by receiving element $500_{22}$ relative to, for example, the phase of the oscillator disposed therein.

Next, during the second time period $T_2$, transmitting element $200_{11}$ is turned off and transmitter $200_{12}$ is turned on to transmit an RF signal. The RF signal transmitted by transmitting element $200_{12}$ is received by one or more of the receiving elements $500_{kl}$, e.g. receiving element $500_{22}$, and delivered to coherent receiver 520, which in response detects the phase of the received signal. The process of turning on (activating) only one transmitting element during any given time period, transmitting an RF signal from the activated transmitting element during that time period, and detecting the phase of the RF signal transmitted by that transmitting element at recovery unit 300 during that time period is repeated until the phase of the RF signal transmitted by each of the transmitting elements is detected at recovery unit 300.

Once the received phases from all transmitting elements $200_{ij}$ is determined and recorded at recovery unit 300, recovery unit 300 sends the recorded phase information back to the generating unit through a wireless communication link established between transceivers 510 and 120. Controller 110 processes the phase information received from recovery unit 300 and, in response, adjusts the phase of each transmitting element $200_{ij}$ so as to ensure that the signals transmitted by individual transmitting elements $200_{ij}$ are substantially in phase when arriving at recovery unit 300. In some embodiments of the present invention, recovery unit 300 includes a controller (not shown). In such embodiments, the processing of the phase information is done by the controller disposed in the recovery unit. Accordingly, in such embodiment, the phase adjustments at any of the transmitting elements is determined by the recovery unit and transmitted to generating unit 100 via the communication link established between the transceivers 120 and 520.

Figure 2:
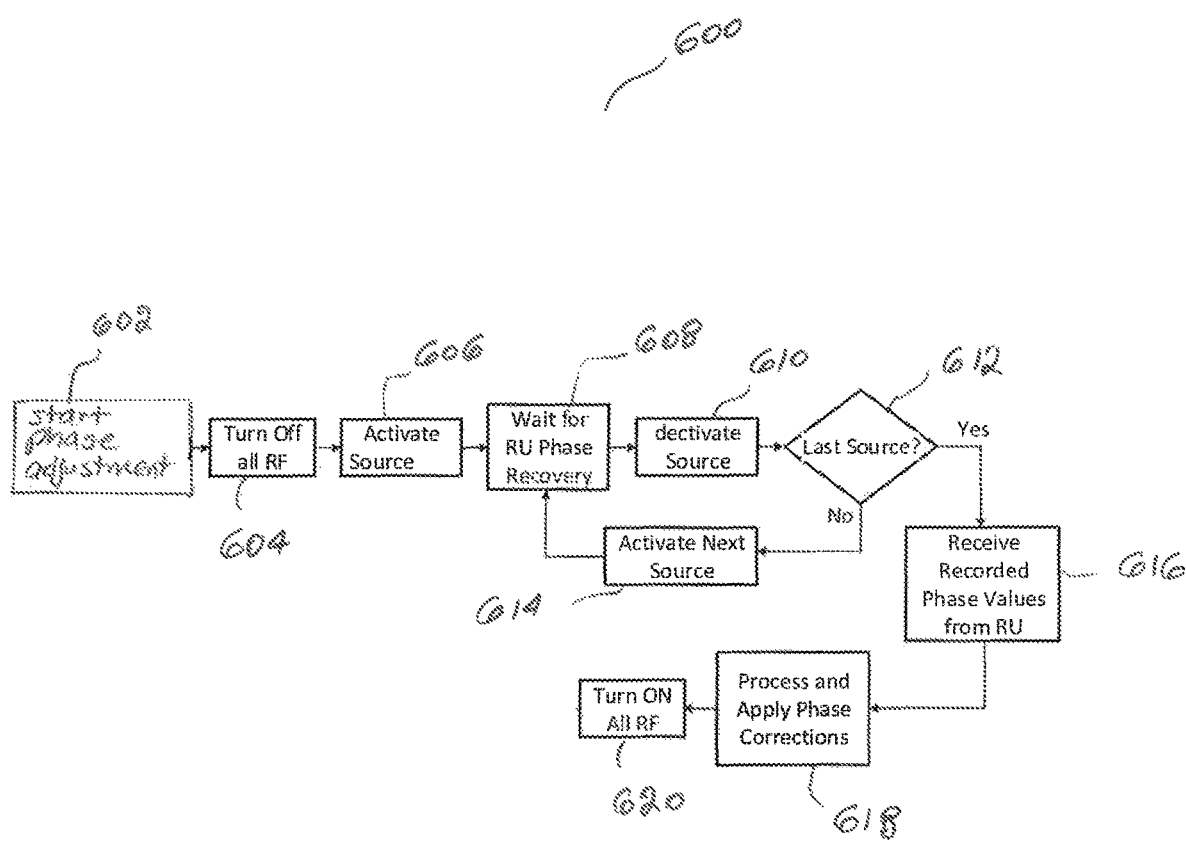
FIG. 2 is a flowchart for adjusting the phases of a multitude of transmitting elements of a wireless power delivery system, in accordance with one embodiment of the present invention.

FIG. 2 is a flowchart 600 for adjusting the phases of the transmitting elements of a wireless power delivery system, in accordance with one embodiment of the present invention. At 602 the phase adjustment starts. Next, at 604 and 606 all transmitting elements (also referred to as source) elements but one are turned off, and the activated transmitting element transmits an RF signal. The phase of the RF signal is detected at the recovery unit (RU) at 608 after which at 610 the transmitting element transmitting the RF signal is deactivated. Next, if at 612 it is determined that the transmitting element deactivated at 610 is the last transmitting element, the phases of the signals detected and recorded by the recovery element are transmitted to the generating unit at 616. At 618 the phases so received by the generating element are processed in order to adjust the phase of each of the transmitting element to maximize the efficiency of power delivery. At 620 all transmitting elements are turned on with their phases adjusted as described in 618. If at 612 it is determined that the transmitting element deactivated at 610 is not the last transmitting element, the next transmitting element in the array is turned on at 614 after which the process is repeated at 608.

Referring to FIG. 1, in accordance with another embodiment of the present invention, in order to set the phase of each transmitting element $200_{ij}$, a first subset of the transmitting elements are turned on during a first time period. The effective or combined phase (and amplitude) of the signals transmitted by the first subset, as received by one or more of the receiving elements $500_{kl}$, is then determined. Next, during a second time period, a second subset of the transmitting elements are turned on to transmit RF signals. The effective or combined phase (and amplitude) of the signals transmitted by the second subset as received by one or more of the receiving elements $500_{kl}$ is then determined. The process of turning on different subsets of the transmitting elements during any given cycle, and receiving the RF signals transmitted by such subset to determine the phase of the subset's combined signals continues until the aggregate phases from different subsets so determined include sufficient diversity to enable the determination of the phases of individual transmitting elements. Different subsets may include, in part, the same transmitting element(s). Mathematically, each transmit antenna contributes to an element of an input vector in a state-space representation, and the signal received from that element contributes to an element of the output vector. By turning on and off different combinations of the transmit antennas, the output vector is determined from which the phases/amplitudes of individual transmit elements are determined.

In accordance with yet another embodiment of the present invention, no transmitting element $200_{ij}$ is turned off during the phase adjustment of the transmitting elements. In such embodiments, during each successive cycle, one or more of the transmitting elements are activated without turning off all of the previously activated transmitting elements. For example, assume during cycle 1 transmitting element $200_{11}$ is activated and the transmitted RF signal is received by recovery unit 300. Next, for example, during cycle 2, while maintaining transmitting element $200_{11}$ activated, transmitting element $200_{12}$ is activated and the transmitted RF signals are received by recovery unit 300. Next, for example, during cycle 3, while maintaining transmitting elements $200_{11}$ and $200_{12}$ activated, transmitting element $200_{13}$ is activated and the transmitted RF signals are received by recovery unit 300. The successive activation of the transmitting elements while maintaining one or more of the previously activated transmitting elements continue until each transmitting element has been activated and transmitted an RF signal.

Next, the phase of, for example, one of the transmitting elements, such as that associated with transmitting element $200_{11}$ is determined. Because the signal received by the recovery unit during the second cycle includes the effect of both transmitting elements $200_{11}$ and $200_{12}$, in this example, the phase (and amplitude) of the signal received during the second cycle is adjusted to compensate (such as subtract) for the phase (and amplitude) of transmitting elements $200_{11}$, as determined during the first cycle, to enable the computation of the phase associated with elements $200_{12}$. Similarly, because the signal received by the recovery unit during the third cycle, in this example, is assumed to include the effect of transmitting elements $200_{11}$, $200_{12}$, and $20_{13}$, the phase (and amplitude) of the signal received during the third cycle is adjusted to compensate for the phases (and amplitudes) of transmitting elements $200_{11}$ and $200_{12}$, to enable the computation of the phase associated with elements $200_{13}$. This process continues until the phases for all transmitting elements are determined. Accordingly, in accordance with such embodiments, during any given cycle, one, multiple or all transmitting elements may be on to enable the determination of their respective phases.

Figure 3:
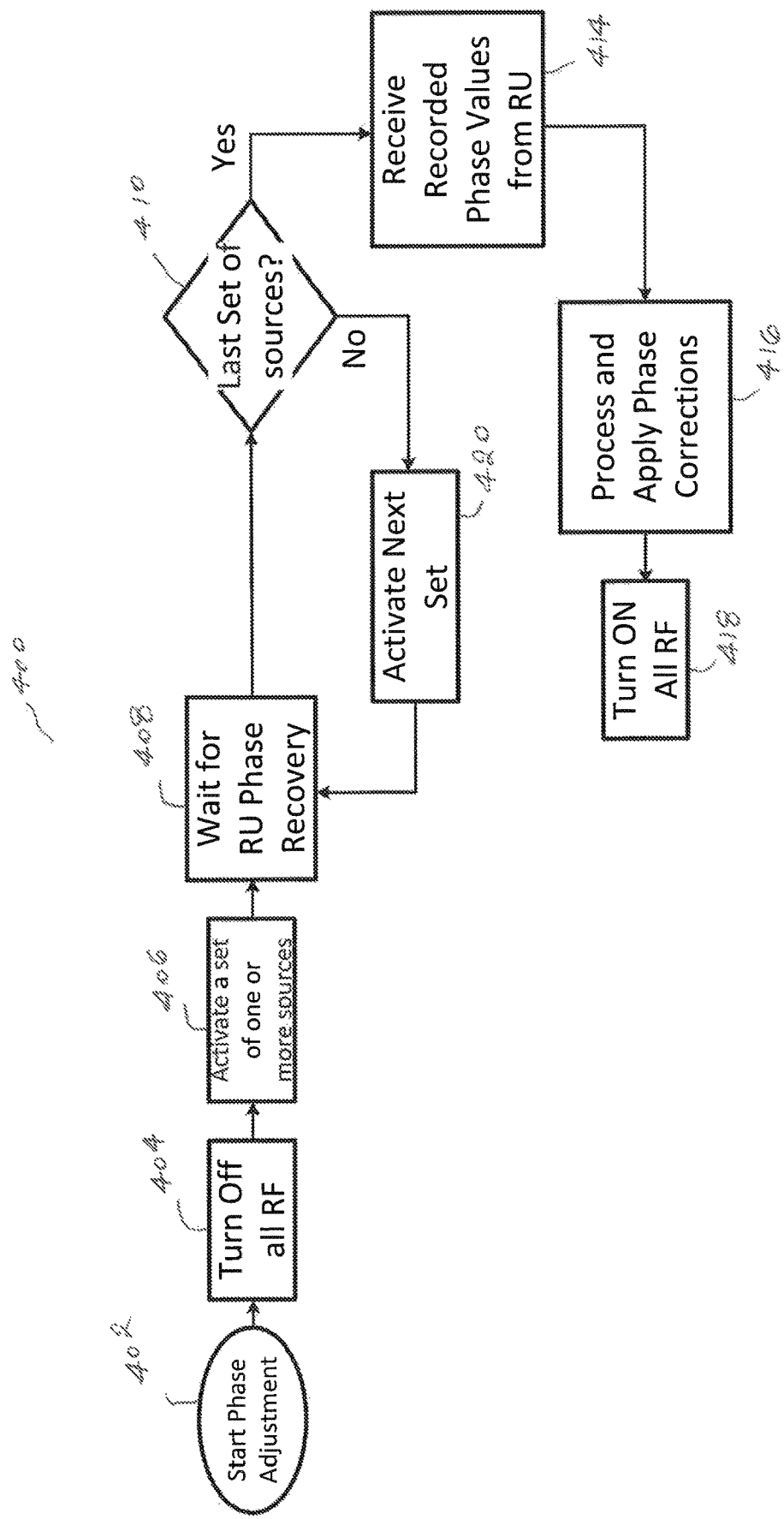
FIG. 3 is a flowchart for adjusting the phases of a multitude of transmitting elements of a wireless power delivery system, in accordance with one embodiment of the present invention.

FIG. 3 is a flowchart 400 for adjusting the phases of the transmitting elements of a wireless power delivery system, in accordance with one embodiment of the present invention. At 402 the phase adjustment starts. Next, at 604 all transmitting elements (also referred to as source) are turned off. At 406 a set of one or more transmitting elements are activated. Next at 408 one or more phase values associated with the RF signals transmitted by the set is determined and/or recorded at the recovery unit (RU). Next, if at 410 it is determined that the set of transmitting element at 406 is the last set of transmitting elements, the phases of the signals detected and/or recorded by the recovery element are transmitted to the generating unit at 414. At 416 the phases so received by the generating element are processed in order to adjust the phase of each of the transmitting element to maximize the efficiency of power delivery. At 418 all transmitting elements are turned on with their phases adjusted as described in 416. If at 410 it is determined that the set of transmitting elements at 406 is not the last transmitting element, the next set of transmitting elements in the array are turned on at 414 after which the process is repeated at 408.

Figure 4:
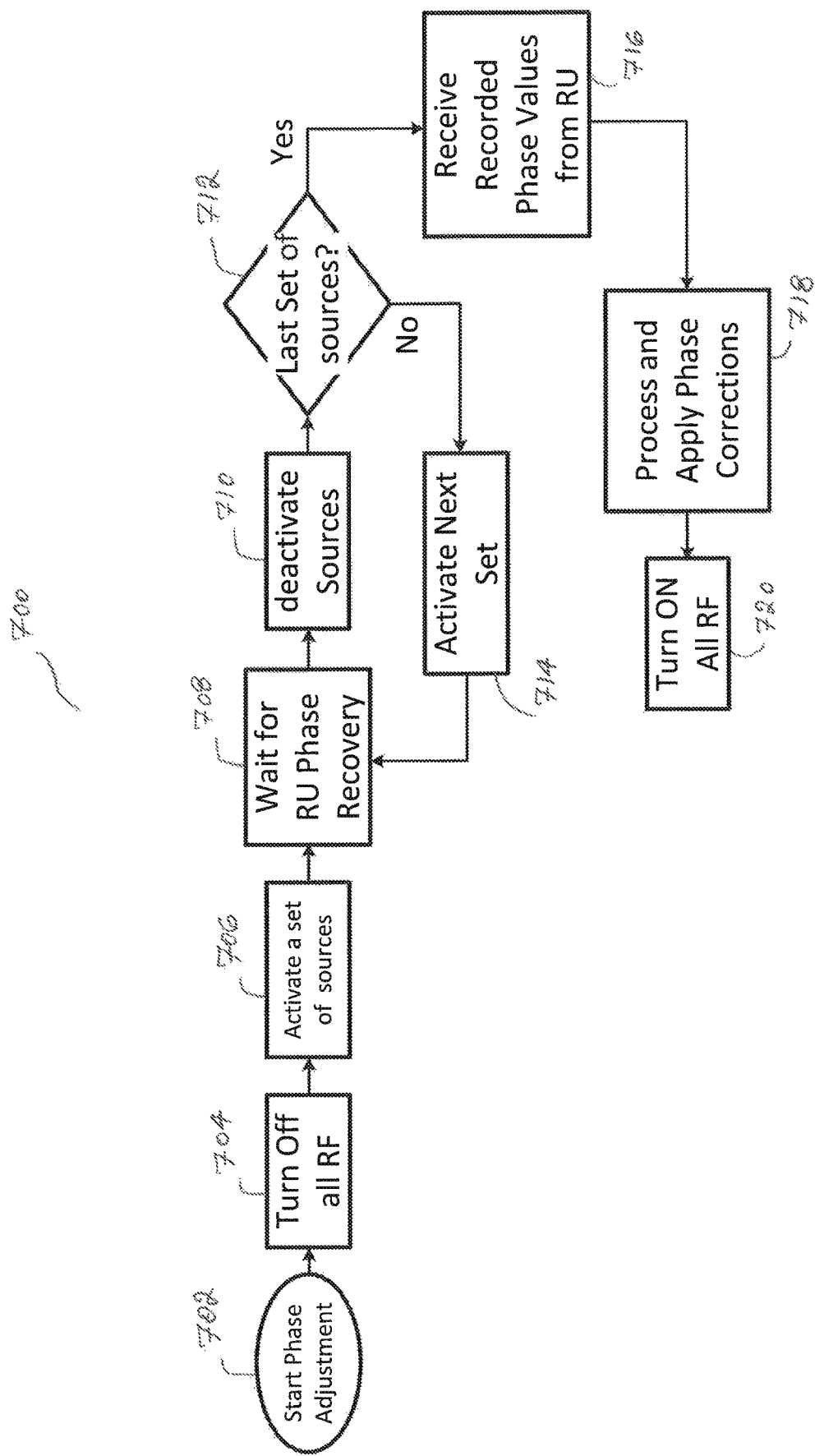
FIG. 4 is a flowchart for adjusting the phases of a multitude of transmitting elements of a wireless power delivery system, in accordance with one embodiment of the present invention.

FIG. 4 is a flowchart 700 for adjusting the phases of the transmitting elements of a wireless power delivery system, in accordance with one embodiment of the present invention. At 702 the phase adjustment starts. Next, at 704 all transmitting elements (also referred to as source) are turned off. At 706 a set of transmitting elements are activated to transmit RF signal. Next at 708 a phase value associated with the RF signals transmitted by the set is determined and/or recorded at the recovery unit (RU). Next, at 710 the set of transmitting elements which transmitted the RF signal is deactivated. Next, if at 712 it is determined that the set of transmitting element deactivated at 710 is the last transmitting element, the phases of the signals detected and/or recorded by the recovery element are transmitted to the generating unit at 716. At 718 the phases so received by the generating element are processed in order to adjust the phase of each of the transmitting element to maximize the efficiency of power delivery. At 720 all transmitting elements are turned on with their phases adjusted as set in 718. If at 712 it is determined that the set of transmitting element deactivated at 710 is not the last set of transmitting element, the next set of transmitting elements in the array is turned on at 714 after which the process is repeated at 708.

Figure 5:
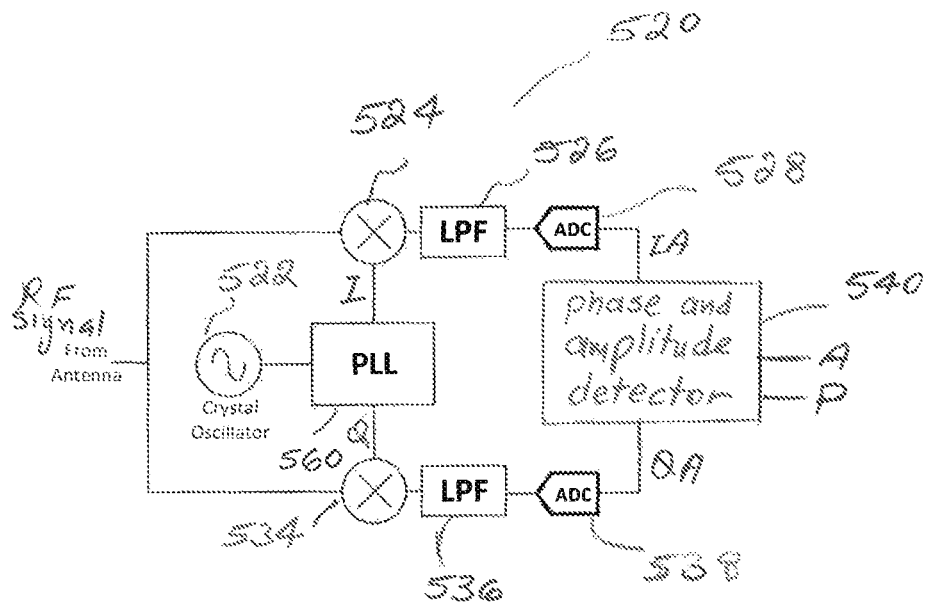
FIG. 5 is a simplified high-level schematic block diagram of a coherent receiver disposed in the recovery unit of FIG. 1, in accordance with one exemplary embodiment of the present invention.

FIG. 5 is a simplified high-level schematic block diagram of a coherent receiver 520 disposed in recovery unit 300 of FIG. 1, in accordance with one exemplary embodiment of the present invention. Mixers 524 and 534 are configured to convert the frequency of the RF signal received by any of the receiving element $500_{kl}$ to a baseband signal in accordance with the in-phase signal I and quadrature signal Q generated by phase locked-loop 560. The baseband signal generated by mixer 524 signal is filtered using low-pass filter 526 and converted to a digital signal using analog-to-digital converter 528 to generate signal IA. Likewise, the baseband signal generated by mixer 534 is filtered using low-pass filter 536 and converted to a digital signal using analog-to-digital converter 538 to generate signal QA. Amplitude and phase detector 540 receives signals IA and QA and in response generates signals A and P representative of phase and amplitude of the RF signal received by the recovery unit. The detected phase P is determined relative to the phase of the oscillating signal generated by crystal oscillator 522.

Figure 6:
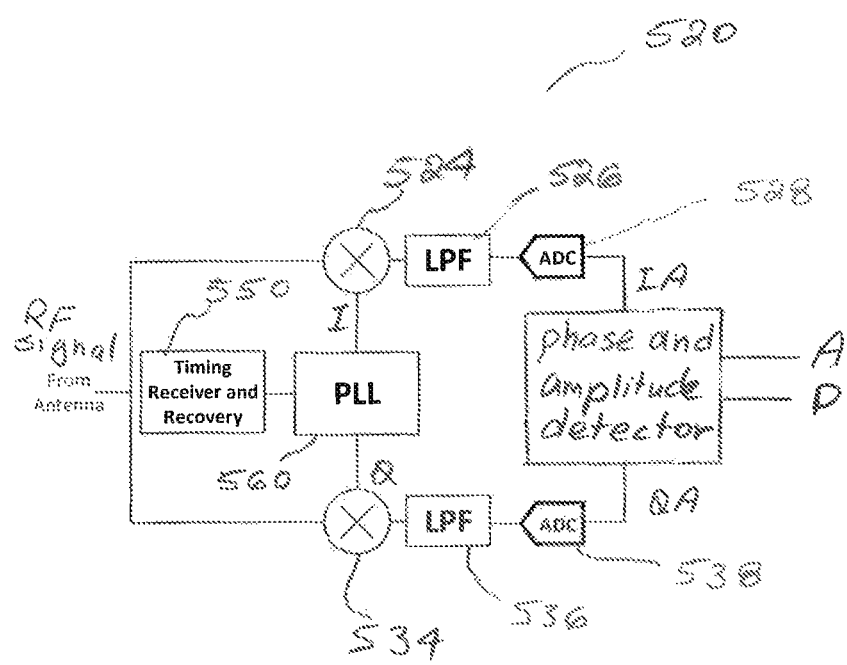
FIG. 6 is a simplified high-level schematic block diagram of a coherent receiver disposed in the recovery unit of FIG. 1, in accordance with another exemplary embodiment of the present invention.

FIG. 6 is a simplified high-level schematic block diagram of a coherent receiver 520 disposed in recovery unit 300 of FIG. 1, in accordance with another exemplary embodiment of the present invention. The coherent receiver of FIG. 4 is similar to the coherent receiver shown in FIG. 3 except that the coherent receiver of FIG. 4 receives, in addition to the transmitted RF signal, data representative of the clock timing used to generate the transmitted RF signal. In other words, the timing used to generate the phase of the transmitted RF signal is also received by the coherent receiver of FIG. 4. Timing receiver and recovery block 550 shown in FIG. 4 recovers the timing data used to generate the phases of the transmitted signals and applies the recovered timing data to phase locked-loop 560. Therefore, in the embodiment shown in FIG. 4, the phases detected by phase and amplitude detector 540 are computed relative to the phase of the clock signal used by the transmitter to generate the phases of the RF signals.

The above embodiments of the present invention are illustrative and not limitative. The embodiments of the present invention are not limited by the number of transmitting elements or receiving elements. The above embodiments of the present invention are not limited by the wavelength of the RF signal used to power a device. The above embodiments of the present invention are not limited by the type of circuitry used to detect the phase of a received RF signal. The above embodiments of the present invention are not limited by the number of semiconductor substrates that may be used to form a generating unit, or receiving unit. Other modifications and variations will be apparent to those skilled in the art and are intended to fall within the scope of the appended claims.

What is claimed is:

1. A method of determining phases of N transmitting elements of a generating unit, N being an integer greater than one, the method comprising:
   turning on a first one of the N transmitting elements during a first time period;
   turning off a remaining (N−1) of the transmitting elements during the first time period;
   transmitting a first RF signal from the first transmitting element to a device during the first time period;
   detecting a first phase value associated with the first RF signal at the device during the first time period;
   transmitting the detected first phase value from the device to the generating unit during the first time period; and
   adjusting the phase of the first transmitting element in response to the detected first phase value.

2. The method of claim 1 further comprising:
   turning off the first one of the transmitting elements;
   turning on a second one of the N transmitting elements during a second time period;
   maintaining a remaining (N−2) of the transmitting elements off during the second time period;
   transmitting a second RF signal from the second transmitting element to the device during the second time period;
   detecting a second phase value associated with the second RF signal at the device during the second time period;
   transmitting the detected second phase value from the device to the generating unit during the second time period; and
   adjusting the phase of the second transmitting element in response to the detected second phase value.

3. The method of claim 1 wherein the first phase value is detected from the first RF signal as received by at least a first receiving element disposed in the device.

4. The method of claim 1 wherein the first phase value is detected from the first RF signal as received by a plurality of receiving elements disposed in the device.

5. The method of claim 1 wherein the first phase value is detected relative to a phase of an oscillating signal disposed in the device.

6. The method of claim 5 further comprising:
   converting the first RF signal to an in-phase baseband signal; and
   converting the first RF signal to a quadrature baseband signal.

7. The method of claim 6 further comprising:
   converting the in-phase baseband signal to a first digital signal; and
   converting the quadrature baseband signal to a second digital signal.

8. The method of claim 7 further comprising:
   detecting the first phase value from the first and second digital signals.

9. The method of claim 1 wherein said first phase value is detected relative to a phase of a timing data received by the device from the generating unit.

10. The method of claim 3 wherein the at least said first receiving element is positioned along a center of an array of receiving elements disposed in the device.

11. A system comprising:
    a generating unit comprising:
    N transmitting elements, wherein N is an integer greater than one; and
    a controller configured to:
    turn on a first one of the N transmitting elements during a first time period;
    turn off a remaining (N−1) of the transmitting elements during the first time period; and
    transmit a first RF signal from the first transmitting element during the first time period; and
    a recovery unit configured to:
    detect a first phase value associated with the first RF signal during the first time period; and
    transmit the detected first phase value to the generating unit during the first time period, said generating unit being further configured to adjust the phase of the first transmitting element in response to the detected first phase value.

12. The system of claim 11 wherein the controller is further configured to:
    turn off the first one of the transmitting elements;
    turn on a second one of the N transmitting elements during a second time period;
    maintain a remaining (N−2) of the transmitting elements off during the second time period;
    transmit a second RF signal from the second transmitting element to the recovery unit during the second time period, and wherein the recovery unit is further configured to:
    detect a second phase value associated with the second RF signal during the second time period;
    transmit the detected second phase value to the generating unit during the second time period, said generating unit being further configured to adjust the phase of the second transmitting element in response to the detected second phase value.

13. The system of claim 11 wherein the first phase value is detected from the first RF signal as received by at least a first receiving element disposed in the recovery unit.

14. The system of claim 11 wherein the first phase value is detected from the first RF signal as received by a plurality of receiving elements disposed in the recovery unit.

15. The system of claim 11 wherein the first phase value is detected relative to a phase of an oscillating signal disposed in the recovery unit.

16. The system of claim 15 wherein said recovery unit further comprises:
    a first mixer configured to convert the first RF signal to an in-phase baseband signal; and
    a second mixer configured to convert the first RF signal to a quadrature baseband signal.

17. The system of claim 16 wherein said recovery unit further comprises:
    a first analog-to-digital converter configured to convert the in-phase baseband signal to a first digital signal; and
    a second analog-to-digital converter configured to convert the quadrature baseband signal to a second digital signal.

18. The system of claim 17 wherein the recovery unit is further configured to:
    detect the first phase value from the first and second digital signals.

19. The system of claim 11 wherein said phase value is detected relative to timing data received by the recovery unit from the generating unit.

20. The system of claim 13 wherein the least first receiving element is positioned along a center of an array of receiving elements disposed in the recovery unit.

21. The method of claim 9 wherein said timing data is transmitted using a first frequency different from a second frequency used to transmit the first RF signal.

22. The method of claim 9 further comprising:
switching between transmission of the timing data from at least one of remaining (N−1) transmitting elements and the transmission of the RF signal from the first transmitting element.

23. A method of determining phases of N transmitting elements of a generating unit, N being an integer greater than one, the method comprising:
turning on a first subset of the N transmitting elements during a first time period;
turning off a remaining ones of the transmitting elements during the first time period;
transmitting a first set of RF signals from the first subset to a device during the first time period;
turning off the first subset;
turning on a second subset of the N transmitting elements during a second time period, said second subset being different than the first subset;
transmitting a second set of RF signals from the second subset to the device during the second time period;
receiving a first signal value associated with the first set of RF signals at the device;
receiving a second signal value associated with the second set of RF signals at the device; and
determining a phase of at least one of the transmitting elements common to both the first and second subsets from the first and second signal values.

24. A method of determining phases of N transmitting elements of a generating unit, N being an integer greater than one, the method comprising:
turning on a first one of the N transmitting elements during a first time period;
turning off a remaining (N−1) of the transmitting elements during the first time period;
transmitting an RF signal from the first transmitting element to a device during the first time period;
turning on a second one of the N transmitting elements during a second time period while maintaining the first one of the N transmitting elements on;
transmitting an RF signal from each of the first and second transmitting elements;
detecting a first value from the RF signal received during the first time period;
detecting a second value from the RF signals received during the second time period; and
determining a phase associated with the second transmitting element from the first and second values.

25. The method of claim 9 wherein said timing data is transmitted from at least one of remaining (N−1) transmitting elements.

* * * * *